(12) United States Patent
Lee et al.

(10) Patent No.: US 9,517,595 B2
(45) Date of Patent: Dec. 13, 2016

(54) COMPOSITE AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Jer-Sheng Lee, New Taipei (TW); Yu-Tsai Wang, New Taipei (TW); Jiang-Long Liang, Shenzhen (CN); Ying-Bo Yang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/641,591

(22) Filed: Mar. 9, 2015

(65) Prior Publication Data

US 2016/0129648 A1  May 12, 2016

(30) Foreign Application Priority Data

Nov. 12, 2014  (CN) .......................... 2014 1 0642837

(51) Int. Cl.
| | | |
|---|---|---|
| *B29C 70/78* | (2006.01) | |
| *B29C 70/68* | (2006.01) | |
| *B05D 1/18* | (2006.01) | |
| *B32B 27/06* | (2006.01) | |
| *B32B 27/34* | (2006.01) | |
| *B32B 27/30* | (2006.01) | |
| *B32B 27/28* | (2006.01) | |
| *B32B 27/38* | (2006.01) | |

(52) U.S. Cl.
CPC ................ *B29C 70/78* (2013.01); *B05D 1/18* (2013.01); *B29C 70/682* (2013.01); *B29C 70/683* (2013.01); *B32B 27/06* (2013.01); *B32B 27/283* (2013.01); *B32B 27/308* (2013.01); *B32B 27/34* (2013.01); *B32B 27/38* (2013.01)

(58) Field of Classification Search
CPC ...... B29C 70/78; B29C 70/682; B29C 70/683; B05D 1/18
See application file for complete search history.

(56) References Cited

U.S. PATENT DOCUMENTS

| | | | | |
|---|---|---|---|---|
| 2008/0202637 A1* | 8/2008 | Hector | ................... | C09K 13/04 |
| | | | | 148/280 |
| 2010/0109201 A1* | 5/2010 | Fletcher | ................. | B82Y 10/00 |
| | | | | 264/334 |
| 2011/0261473 A1* | 10/2011 | Weisse | ................ | C23C 18/1689 |
| | | | | 359/838 |
| 2014/0120283 A1* | 5/2014 | Zhou | ...................... | B05D 7/546 |
| | | | | 428/35.9 |
| 2015/0197048 A1* | 7/2015 | Chiang | ............. | B29C 45/14311 |
| | | | | 428/307.3 |

\* cited by examiner

*Primary Examiner* — Hai Vo
(74) *Attorney, Agent, or Firm* — Zhigang Ma

(57) ABSTRACT

A composite includes a substrate having an oxide layer, a nano film formed on the oxide layer, a plastic member, the nano film has a three-dimensional network structure, the plastic member covers the nano film and penetrates into the three-dimensional network structure, the plastic member bonds with the substrate through the nano film and the oxide layer.

4 Claims, 6 Drawing Sheets

COMPOSITE AND METHOD FOR MAKING SAME

FIELD

The subject matter herein generally relates to a composite and a method for making the composite.

BACKGROUND

Composites are used in a wide range of industrial fields including the production of parts for automobiles, domestic appliances, industrial machinery, and the like. Generally, the dissimilar materials are joined together by adhesive which cannot provide the dissimilar materials with a high-strength composite.

BRIEF DESCRIPTION OF THE FIGURES

Implementations of the present technology will now be described, by way of example only, with reference to the attached figures.

DETAILED DESCRIPTION

Figure 1:
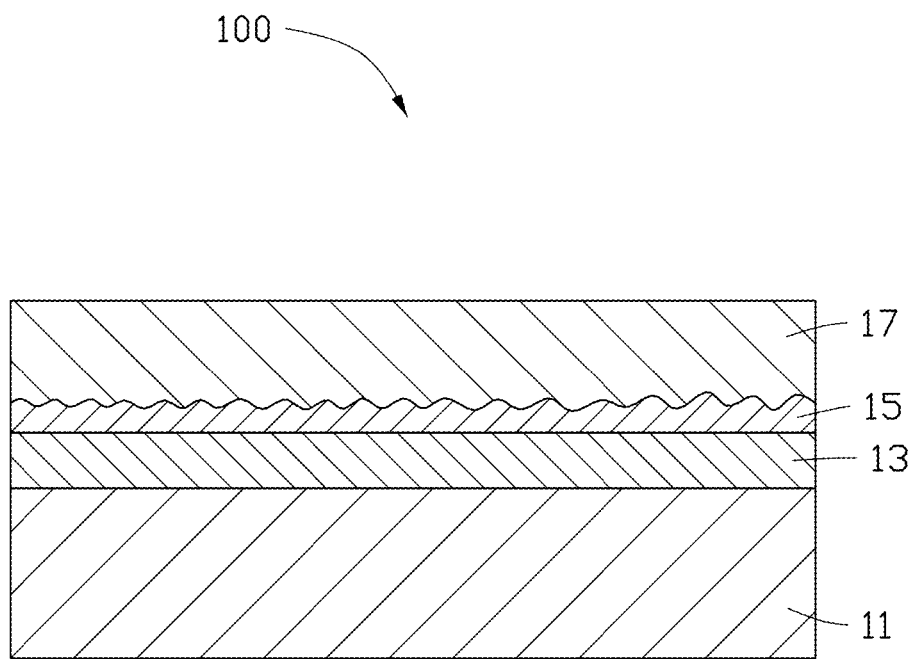
FIG. 1 is a cross-sectional view of a first exemplary embodiment of a composite.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

FIG. 1 illustrates a composite 100 according to a first exemplary embodiment. The composite 100 includes a substrate 11, an oxide layer 13 formed on the substrate 11, a nano film 15 formed on the oxide layer 13, and a plastic member 17 formed on the nano film 15.

The substrate 11 can be made of a metal, which can be selected from a group consisting of stainless steel, aluminum, aluminum alloy, iron, iron alloy, magnesium, magnesium alloy, copper, copper alloy, titanium and titanium alloy.

The oxide layer 13 is an oxide layer that forms on the substrate 11 when the substrate 11 is exposed to air. In at least one exemplary embodiment, the substrate 11 is selected from a group consisting of stainless steel, aluminum, aluminum alloy, iron, iron alloy, copper and copper alloy, and the oxide layer 13 is an iron oxide, an aluminum oxide, or an copper oxide. The oxide layer 13 can have a thickness of between about 5 μm to about 15 μm, after being chemically polished.

In another exemplary embodiment, the substrate 11 is titanium, titanium alloy, magnesium, or magnesium alloy, and the substrate 11 does not need to be chemical polished, and the oxide layer 13 has a thickness of about 5 μm to about 15 μm, and can be titanium oxide or magnesium oxide.

Oxide contained in the oxide layer 13 can be presented by MeO, wherein the Me refers to metal. A plurality of hydroxides can form on a surface of the oxide layer 14 by hydrolysis reaction, the hydroxides can be presented by MeOH.

The nano film 15 has a three-dimensional network structure and has a thickness of about 1 nm to about 15 nm. In at least one exemplary embodiment, the nano film 15 can have a colorless and transparent appearance. The nano film 15 includes products of a silane coupling reaction between parts of the OH groups contained in resultant hydrolytic reaction products of alkaline organic silanes reacting with water and the hydroxides of the oxide layer 13 resulted from reaction between the oxide layer 13 and water, and other products of a polycondensation reaction among remaining OH groups contained in the resultant hydrolytic reaction products.

The alkaline organic silane includes Si elements and alkyls. The alkaline organic silane can be presented by $R'(CH_2)_nSi(OR)_3$, wherein R' refers to organic group, OR refers to hydrolysable group, n refers to the number of $CH_2$ groups, and the organic group can be a methyl group, an ethyl group, a butyl group or an amyl group.

Parts of the OH groups contained in the resultant hydrolytic reaction products can react with the hydroxides (MeOH) of the oxide layer 13 to form a plurality of Si—O-Me groups, the remaining OH groups contained in the resultant hydrolytic reaction products can react with each other by a polycondensation reaction, forming the nano film 15 having three-dimensional network structure. The nano film 15 can strongly bond with the substrate 11 through the Si—O-Me groups.

The plastic member 17 can cover the nano film 15 and penetrate into the three-dimensional network structure of the nano film 15, such that that the plastic member 17 can bond with the substrate 11 through the nano film 15 and the oxide layer 13.

The resin can be selected from a group consisting of polybutylene terephthalate (PBT), polyphenylene sulfide (PPS), polyethylene tereph-thalate (PET), polycarbonate (PC), polyamide (PA), polypropylene (PP), acrylonitrile butadiene styrene copolymers (ABS), thermoplastic polyurethane (TPU), and poly(1,4cyclohexylene dimethylene terephthalate) (PCT).

Figure 2:
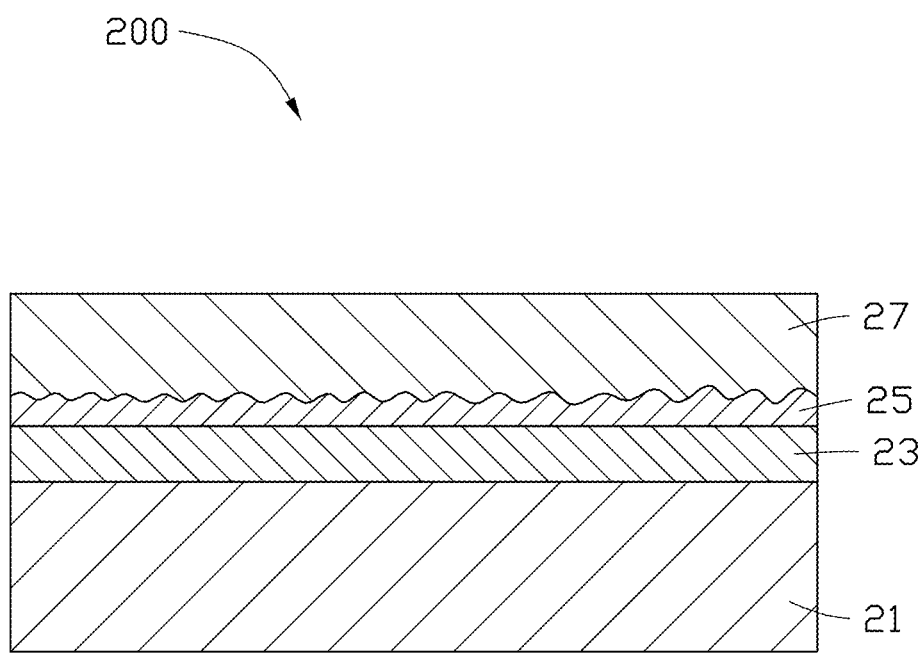
FIG. 2 is a cross-sectional view of a second exemplary embodiment of a composite.

FIG. 2 illustrates a composite 200 according to a second exemplary embodiment. The composite 200 includes a substrate 21, an ink layer 23 formed on the substrate 21, a nano film 25 formed on the ink layer 23, and a plastic member 27 formed on the nano film 25.

The substrate 21 can be a metal or a metalloid. The metal can be selected from a group consisting of stainless steel, aluminum, aluminum alloy, iron, iron alloy, magnesium, magnesium alloy, copper, copper alloy, titanium and titanium alloy. The metalloid can be glass, ceramic or resin.

The ink layer 23 has a thickness of about 15 μm to about 25 μm, and can be made of an epoxy resin, a polyamide resin or an acrylic resin. The ink layer 23 has a plurality of alkyls.

In at least one exemplary embodiment, a small amount of natural resin can be mixed in the ink layer 23.

The nano film 25 can have a three-dimensional network structure. The nano film 25 has a thickness of about 3 nm to about 15 nm. In at least one exemplary embodiment, the nano film 25 can have a colorless and transparent appearance.

The nano film 25 is a product of a polycondensation reaction between OH groups contained in resultant hydrolytic reaction products resulted from alkaline organic silanes reacting with water; the nano film 25 has Si—O—Si groups and alkyls.

The alkaline organic silane has Si elements and alkyls, and can be presented by $R'(CH_2)_nSi(OR)_3$, wherein R' refers to organic group, OR refers to hydrolysable group, n refers to the number of $CH_2$ groups, and the organic group can be a methyl group, an ethyl group, a butyl group or an amyl group.

As the alkyls contained in the nano film 25 and the alkyls contained in the ink layer 23 can have the same or similar structure, the nano film 25 can bond with the ink layer 23 according to the like dissolves like principle, such that the plastic member 27 can bond with the substrate 21 through the nano film 25 and the ink layer 23.

The plastic member 27 can be made of a resin which can be selected from a group consisting of polybutylene terephthalate (PBT), polyphenylene sulfide (PPS), polyethylene tereph-thalate (PET), polycarbonate (PC), polyamide (PA), polypropylene (PP), acrylonitrile butadiene styrene copolymers (ABS), thermoplastic polyurethane (TPU), and poly(1,4cyclohexylene dimethylene tereph-thalate) (PCT).

Figure 5:
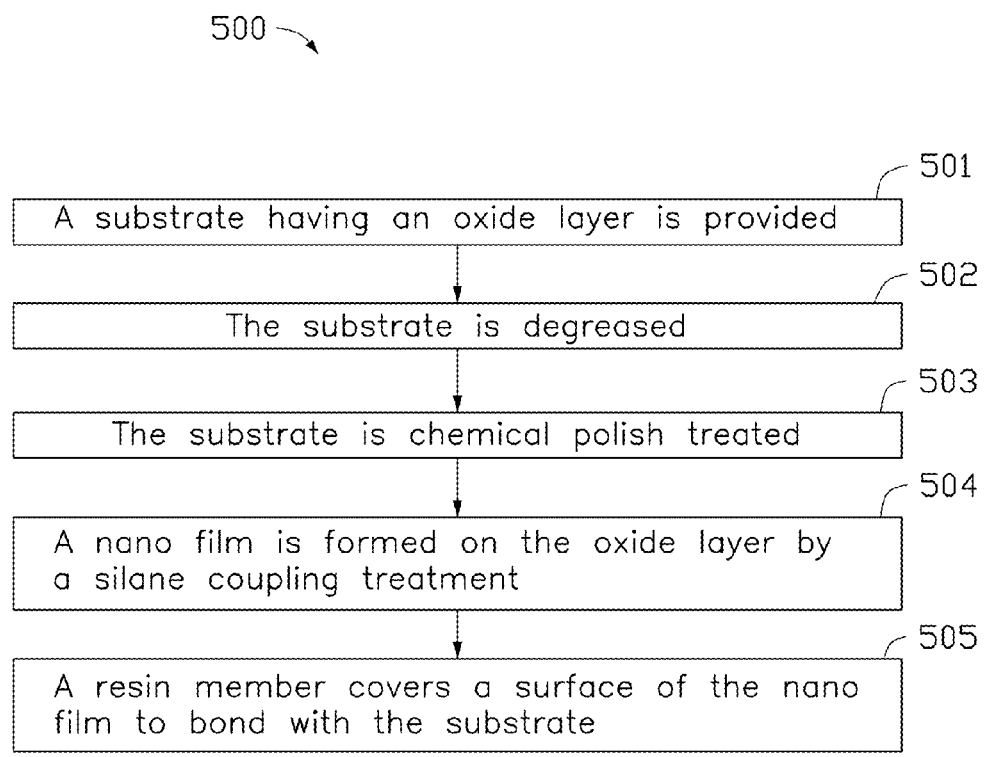
FIG. 5 is a flow chart of a method of making a composite in accordance with a first exemplary embodiment.

Referring to FIG. 5, a flowchart is presented in accordance with a first example embodiment. The method 500 is provided by way of example, as there are a variety of ways to carry out the method. The method 500 described below can be carried out using the configurations illustrated in FIGS. 1 and 3, for example, and various elements of these figures are referenced in explaining example method 500. Each block shown in FIG. 5 represents one or more processes, methods or subroutines, carried out in the method 500. Furthermore, the order of blocks is illustrative only and the order of the blocks can change according to the present disclosure. Additional blocks can be added or fewer blocks can be utilized, without departing from this disclosure. The method 500 can begin at block 501.

At block 501, a substrate 11 is provided. In at least one exemplary embodiment, the substrate 11 is selected from a group consisting of stainless steel, aluminum, aluminum alloy, iron, iron alloy, copper and copper alloy.

An oxide layer 13 is formed on the substrate 11 when the substrate 11 is exposed to air. The oxide layer 13 can be an iron oxide, an aluminum oxide, or a copper oxide.

At block 502, the substrate 11 is degreased. The degreasing process includes dipping the substrate 11 in a degreasing solution for about 5 minutes to about 12 minutes to remove contaminants coated on the oxide layer 13. The degreasing solution may be a conventional degreasing solution. The temperature of the degreasing solution can be in a range of about 55° C. to about 65° C. Then, the substrate 11 is removed from the degreasing solution and rinsed with water.

At block 503, the substrate 11 is chemically polished to improve surface flatness of the oxide layer 13. The oxide layer 13 can have a thickness of about 5 μm to about 15 μm, after being chemically polished.

The chemical polishing can be carried out by dipping the substrate 11 into a polish solution having a temperature in a range of about 90° C. to about 100° C. The dipping time can last for about 5 seconds to about 12 seconds. The polish solution can include sulphuric acid having a concentration of about 280-300 g/L, and phosphoric acid having a concentration of about 1150-1450 g/L.

At block 504, a nano film 15 is formed on the oxide layer 13 by a silane coupling treatment. The nano film 15 has a thickness of between about 1 nm to about 15 nm, and has a three-dimensional network structure. The silane coupling treatment can be carried out by dipping the substrate 11 into a film-forming solution having a pH value of about 8-9. The dipping process can last for 5 minutes to about 10 minutes. The silane coupling treatment can be carried out at room temperature; preferably, the temperature can be in a range of about 20° C. to about 43° C.

The film-forming solution includes alkaline organic silanes and water with a mass ratio of about 1-3:30-100. The film-forming solution can be stored for about 30 days to about 50 days. The alkaline organic silane has Si elements and alkyls. The alkaline organic group can be presented by $R'(CH_2)_nSi(OR)_3$, wherein R' refers to organic group, OR refers to hydrolysable group, n refers to the number of $CH_2$ groups, and the organic group can be an methyl group, an ethyl group, a butyl group or an amyl group.

During the silane coupling treatment, the alkaline organic silanes can react with water by a hydrolytic reaction to form resultant hydrolytic reaction products having OH groups. A reaction equation of the hydrolytic reaction of alkaline organic silane can be:

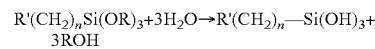

$$R'(CH_2)_nSi(OR)_3 + 3H_2O \rightarrow R'(CH_2)_n-Si(OH)_3 + 3ROH$$

The oxide layer 13 can also react with water by a hydrolytic reaction to form a plurality of hydroxides, such that a surface of the oxide layer 13 can have a plurality of OH groups. Oxide of the oxide layer 13 can be presented by MeO, the hydroxides can be presented by MeOH, wherein Me refers to metal. A reaction equation of the hydrolytic reaction of the oxide layer 13 can be:

$$MeO + H_2O \rightarrow 2MeOH$$

The MeOH of the surface of the oxide layer 13 can react with parts of OH groups contained in the resultant hydrolytic reaction products by a silane coupling reaction to form a plurality of Si—O-Me groups, the Si—O-Me groups have covalent bonds. The nano film 15 can strongly bond with the substrate 11 through the Si—O-Me groups. A reaction equation of the silane coupling reaction can be:

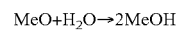

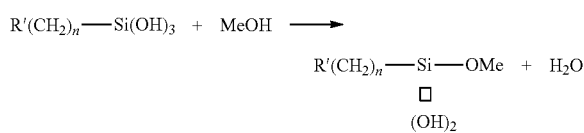

Remaining OH groups contained in the resultant hydrolytic reaction products can react with each other to form a plurality of Si—O—Si groups by a polycondensation reaction, forming the nano film 15 having three-dimensional network structure. A reaction equation of the polycondensation reaction can be:

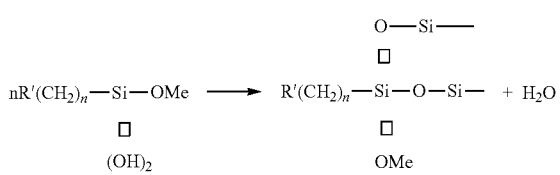

Figure 3:
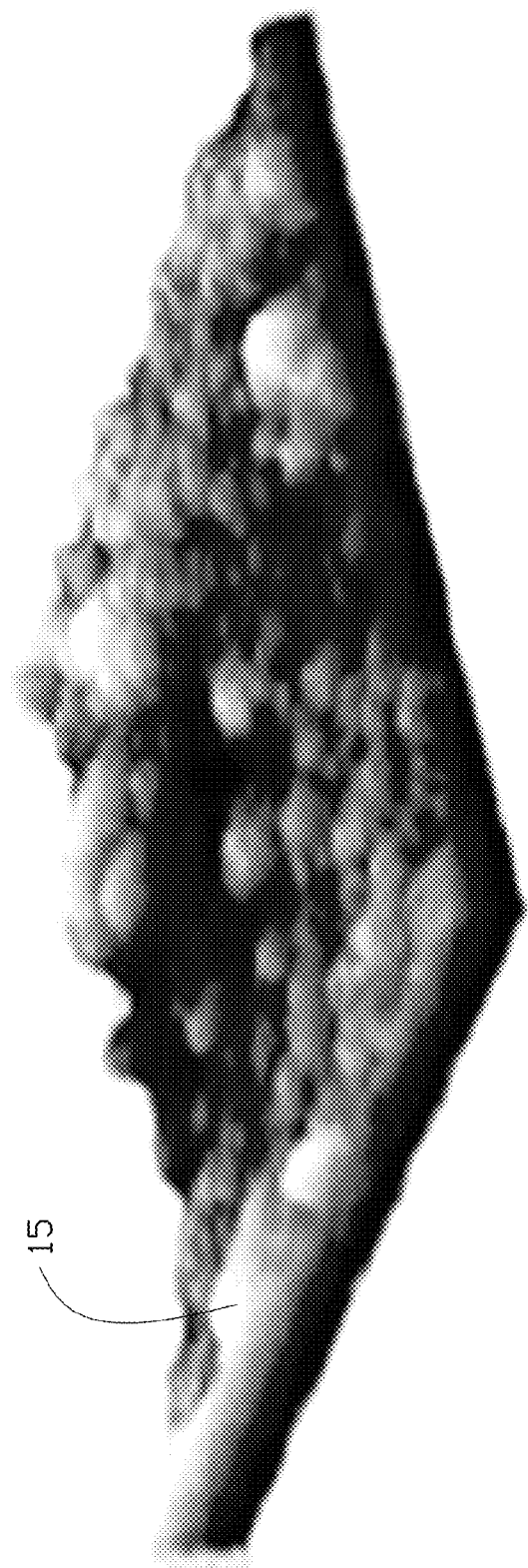
FIG. 3 is an atomic force microscopy photo of the first exemplary embodiment of a composite.

FIG. 3 illustrates that an atomic force microscopy test indicates that the nano film 15 has three-dimensional network structure.

It is to be understood, the substrate 11 can also be a titanium, a titanium alloy, a magnesium, or a magnesium alloy, and the oxide layer 13 formed on the substrate 11 can be titanium oxide or magnesium oxide, and the substrate 11 does not need to be chemical polish treated. The oxide layer 13 has a thickness of about 5 μm to about 15 μm. A nano film 15 can be formed on the oxide layer 13 by a silane coupling treatment after the substrate 11 being degreased.

At block 505, the substrate 11 is placed into a mold (not shown), liquid resin having a temperature of about 200-320° C. is injected into the mold, the liquid resin can cover the nano film 15 and penetrate into the three-dimensional network structure of the nano film 15, such that the plastic member 17 can bond with the substrate 11 through the nano film 15 and the oxide layer 13, the substrate 11, the oxide layer 13, the nano film 15 and the plastic member 17 cooperatively form the composite 100. The temperature of the mold can be maintained in a range of about 40° C. to about 150° C. The injection pressure is in a range of about 1300 Pa to about 1700 Pa, and the injection speed is in a range of about 85 mm/s to about 105 mm/s. The pressure should be maintained in a range of about 1350-1450 Pa for about 1 second to about 2 seconds. The thickness of the plastic member 17 can be changed according to the composite 100.

The resin can be selected from a group consisting of polybutylene terephthalate (PBT), polyphenylene sulfide (PPS), polyethylene tereph-thalate (PET), polycarbonate (PC), polyamide (PA), polypropylene (PP), acrylonitrile butadiene styrene copolymers (ABS), thermoplastic polyurethane (TPU), and poly(1,4cyclohexylene dimethylene tereph-thalate) (PCT).

It is to be understood, the thickness of the plastic member 17 can be changed according to production requirement.

Figure 6:
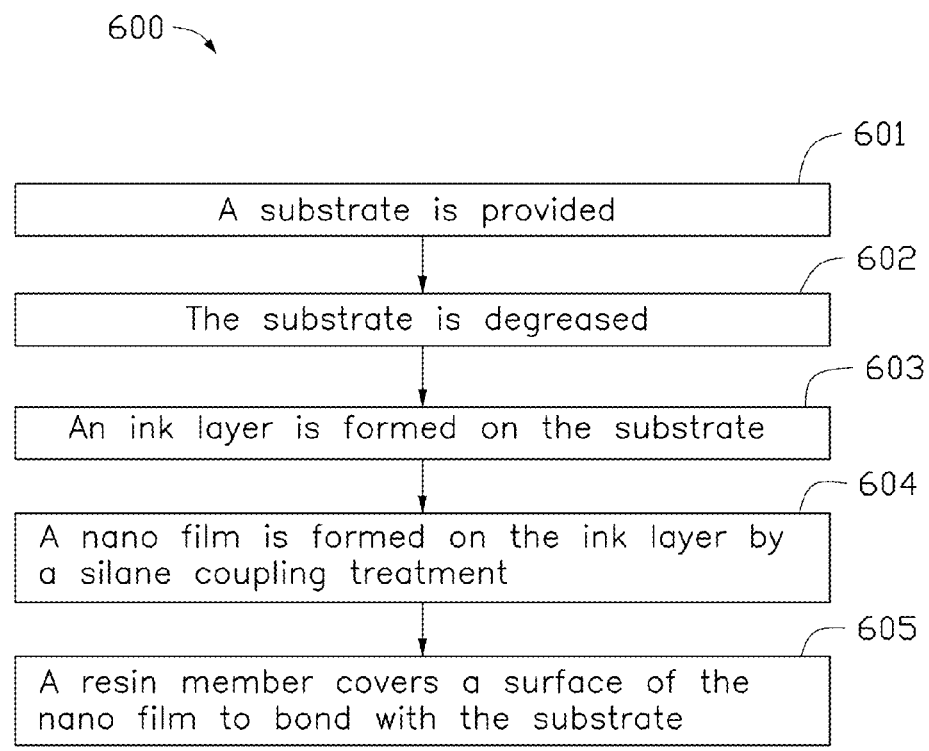
FIG. 6 is a flow chart of a method of making a composite in accordance with a second exemplary embodiment.

Referring to FIG. 6, a flowchart is presented in accordance with a second example embodiment. The method 600 is provided by way of example, as there are a variety of ways to carry out the method. The method 600 described below can be carried out using the configurations illustrated in FIGS. 2 and 4, for example, and various elements of these figures are referenced in explaining example method 600. Each block shown in FIG. 6 represents one or more processes, methods or subroutines, carried out in the example method 600. Furthermore, the order of blocks is illustrative only and the order of the blocks can change according to the present disclosure. Additional blocks can be added or fewer blocks can be utilized, without departing from this disclosure. The method 600 can begin at block 601.

At block 601, a substrate 11 is provided. The substrate 21 can be a metal or a metalloid. The metal can be selected from a group consisting of stainless steel, aluminum, aluminum alloy, iron, iron alloy, magnesium, magnesium alloy, copper, copper alloy, titanium and titanium alloy. The metalloid can be a glass, a ceramic or a resin.

At block 602, the substrate 21 is degreased. The degreasing process includes dipping the substrate 21 in a degreasing solution to remove impurities coated on the substrate 21. The degreasing solution may be a conventional weak alkaline.

At block 603, an ink layer 23 is formed on the substrate 21. The ink layer 23 has a thickness of between about 15 μm to about 25 μm, and can be made of an epoxy resin, a polyamide resin or an acrylic resin. The ink layer 23 has alkyls. It is to be understood that a small amount of natural resin can be mixed in the ink layer 23.

At block 604, a nano film 25 is formed on the ink layer 23 by a silane coupling treatment. The nano film 25 has a thickness of between about 3 nm to about 15 nm, and has a three-dimensional network structure. In at least one exemplary embodiment, the nano film 25 can have a colorless and transparent appearance.

The silane coupling treatment can be carried out by dipping the substrate 21 into a film-forming solution having a pH value of about 8-9. The dipping process may last for 5 minutes to about 10 minutes. The silane coupling treatment can be carried out at room temperature; preferably, the temperature can be in a range of about 20° C. to about 43° C.

The film-forming solution includes alkaline organic silanes and water with a mass ratio of about 1-3:30-100. The film-forming solution can be stored for about 30 days to about 50 days. The alkaline organic silane has Si elements and alkyls which can be selected from a group consisting of a methyl group, an ethyl group, a butyl group and an amyl group. The alkaline organic group can be presented by R'(CH$_2$)$_n$Si(OR)$_3$, wherein R' refers to organic group, OR refers to hydrolysable group, n refers to the number of CH$_2$ groups, and the organic group can be a methyl group, an ethyl group, a butyl group or an amyl group.

During the silane coupling treatment, the alkaline organic silanes can react with water by a hydrolytic reaction to form resultant hydrolytic reaction products having a plurality of OH groups. A reaction equation of the hydrolytic reaction of the alkaline organic silane can be:

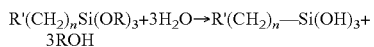

The OH groups contained in the resultant hydrolytic reaction products can react with each other to form a plurality of Si—O—Si groups by a polycondensation reaction, forming the nano film 25. A reaction equation of the polycondensation reaction can be:

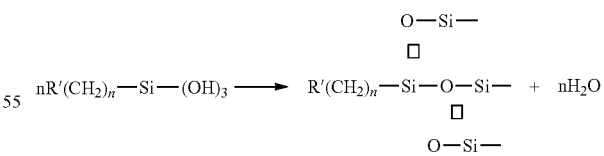

As the alkyls contained in the nano film 25 and the alkyls contained in the ink layer 23 can have the same or similar structure, the nano film 25 can bond with the ink layer 23 according to the like dissolves like principle, such that the plastic member 27 can bond with the substrate 21 through the nano film 25 and the ink layer 23.

Figure 4:
FIG. 4 is an atomic force microscopy photo of the second exemplary embodiment of a composite.

FIG. 4 illustrates that an atomic force microscopy test indicates that the nano film 25 has three-dimensional network structure.

At block 605, the substrate 21 is placed into a mold (not shown), liquid resin having a temperature in the range of about 250-275° C. is injected into the mold, the liquid resin can cover a surface of the nano film 25 and penetrate into the three-dimensional network structure of the nano film 25, such that the plastic member 27 can bond with the substrate 21 through the nano film 25 and the ink layer 23, the substrate 21, the ink layer 23, the nano film 25 and the plastic member 27 cooperatively form the composite 200. The temperature of the mold can be maintained in a range of about 140° C. to about 145° C. The injection pressure is in the range of about 1300 Pa to about 1700 Pa, and the injection speed is in the range of about 85 mm/s to about 105 mm/s. The pressure should be maintained at 1350-1450 Pa for about 1 second to about 2 seconds. The thickness of the plastic member 27 can be changed according to the need of the composite 200.

The plastic member 27 can be made of a resin which can be selected from a group consisting of polybutylene terephthalate (PBT), polyphenylene sulfide (PPS), polyethylene tereph-thalate (PET), polycarbonate (PC), polyamide (PA), polypropylene (PP), acrylonitrile butadiene styrene copolymers (ABS), thermoplastic polyurethane (TPU), and poly(1,4cyclohexylene dimethylene terephthalate) (PCT).

Tensile and shear strength tests are applied to the composite 100, 200. The results show that the tensile strength of the composite 100, 200 can reach 3-8 MPa, and the shear strength of the composite can reach 21.5-24.6 MPa. After repeated cold and hot shock testing for 48 hours at temperatures in a range of −40° C. to 85° C., in 4 hour cycles, the tensile and shear strength of the composite 100, 200 do not become notably weaker.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A composite comprising:
   a substrate;
   an ink layer formed on the substrate;
   a nano film formed on the ink layer, the nano film having a three-dimensional network structure and a thickness of between about 3 nm to about 15 nm; and
   a plastic member covering the nano film and penetrating into the three-dimensional network structure, the plastic member bonding with the substrate through the nano film and the ink layer.

2. The composite as claimed in claim 1, wherein the nano film is a product of a polycondensation reaction between OH groups contained in resultant hydrolytic reaction products of alkaline organic silanes reacting with water, the nano film has Si—O—Si groups and alkyls.

3. The composite as claimed in claim 2, wherein the ink layer contains alkyls, the alkyls of the ink layer and the alkyls of the nano film have the same or similar structure, such that the ink layer bonds with the nano film.

4. The composite as claimed in claim 1, wherein the ink layer has a thickness of between about 15 μm to about 25 μm, and is made of an epoxy resin, a polyamide resin or an acrylic resin.

\* \* \* \* \*